C. D'ASCANIO.
CLINOMETER.
APPLICATION FILED APR. 7, 1917.

1,261,776.

Patented Apr. 9, 1918.

Inventor.
Corradino D'Ascanio,
By [signature] atty.

UNITED STATES PATENT OFFICE.

CORRADINO D'ASCANIO, OF TURIN, ITALY.

CLINOMETER.

1,261,776.　　　　　Specification of Letters Patent.　　Patented Apr. 9, 1918.

Application filed April 7, 1917. Serial No. 160,523.

*To all whom it may concern:*

Be it known that I, CORRADINO D'ASCANIO, civil engineer, a subject of the King of Italy, living at 366 Corso Francia, Turin, in the Kingdom of Italy, have invented certain new and useful Improvements in Clinometers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to clinometers or devices for measuring inclinations and its object is to provide aircraft, more particularly aeroplanes and the like, with an instrument, which, when once it is fixed in a position such that it can easily be inspected by the pilot and that the indicator of the instrument is perpendicular to the horizontal line of flight, which is different for each flying machine it automatically indicates at every instant the inclination of the aeroplane, whether longitudinal, due to pitching displacements, or lateral, if that becomes faulty either by accident or inadvertence at night or in foggy weather or by an erroneous inclination having been impressed on it when turning while the correct lateral inclination during flight in a curve will not be indicated by the instrument, as explained below. On account of the said property this instrument is here designated automatic universal clinometer, and it is of great utility in aeroplanes, for which it is intended, particularly for flying at night and in foggy weather.

This invention is illustrated in the accompanying drawing, merely by way of example, the construction and arrangement of its parts and their proportions admitting of being varied without going outside the scope of the invention, which is substantially based on the movement of liquids in vessels communicating with one another.

Figure 1:
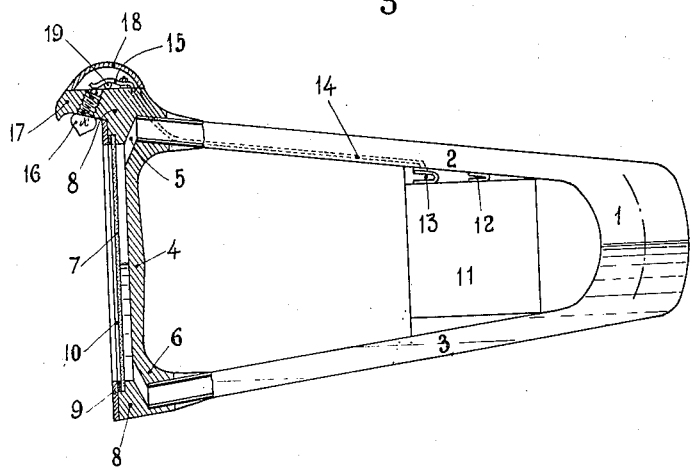
Figure 2:
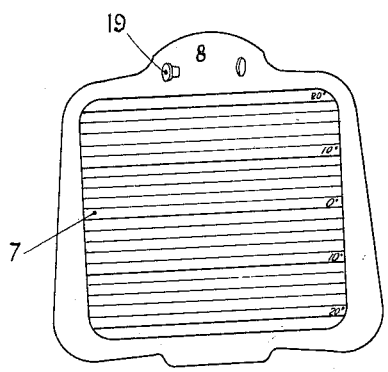

Figures 1 and 2 are respectively a side elevation of the clinometer as a whole and a back view, that is to say, a view of the indicator.

According to the principle forming the basis of the invention, the clinometer comprises a reservoir 1 for the liquid, which may be of any shape but is preferably a cylindrical tube having its axis in a vertical plane and preferably curved, and of a sufficiently large horizontal sectional area to give the instrument great sensitiveness; two communication passages 2, 3, one upper and the other lower, with their axes arranged in the vertical plane containing the axis of the instrument and preferably having the form of tubes of comparatively but not excessively small sectional area so as to prevent the liquid from moving too slowly, which would hinder prompt indication. These communication tubes, moreover, in the example illustrated, are divergent backward, starting from the reservoir 1, with which they are suitably connected, an indicator, in the shape of a square frame, arranged at the back, in a vertical plane perpendicular to the general axis of the instrument and comprising the bottom 4 (of metal, as are also the reservoir and the communication tubes), into which the free ends of the said tubes are suitably fixed, and in which passages 5, 6 are cut in order that the liquid may be able to pass through the said bottom; the pane of glass or crystal 7, is fitted, a little way away from the bottom 4, into a socket running all around the edge 8 and projecting outward in the form of a frame beyond the bottom 4, a closure frame 9, of sheet iron, applied to the window with the interposition of suitable packing 10, and soldered, welded or otherwise fixed to the said edge, this indicating frame thus constituting the second of the two communicating vessels. It is obvious that the instrument is perfectly fluid tight.

The liquid is preferably colored, so as to increase its visibility; but above all it ought to be slightly viscous so as to obviate jerky movements and violent oscillations and incongealable, so as to admit of being used at great heights and at any temperature. A very suitable liquid is an alcoholic solution of glycerin and anilin.

It follows from what has been said above that this clinometer indicates the inclinations of the flying machine at every instant with the utmost correctness and clearness, by the immediate variations of the position of the meniscus of the liquid in the frame; and moreover it measures them by means of the scale engraved or otherwise indicated on the window 7 (Fig. 2).

With a view to obtaining a scale that will always be easily legible and sufficiently ample in relation to possible large inclinations, especially of the pitching type of the flying machine, which are necessary in maneuvering it, the frame should necessarily be of considerable height, from which the utility of the divergence of the communication tubes 2, 3 becomes evident as the reservoir 1 should have a comparatively large horizontal sectional area, without any considerable height.

The scale on the window consists of straight lines, practically equidistant, and horizontal, that is to say, parallel to the lower and upper sides of the frame, the zero being in the middle and corresponding to the position of the meniscus of the liquid when the flying machine is in horizontal flight.

In the example illustrated in the drawing each line corresponds to two degrees of inclination of the flying machine, the 10 and 20 degrees being marked both for elevation and for depression. In this way the scale indicates and measures the pitching or longitudinal inclinations of the machine.

As regards the transverse inclinations it should be observed above all that they will be indicated by a corresponding obliquity of the meniscus of the liquid with respect to the lines on the said scale and if desired a scale oblique with respect to the previous scale, and preferably double for the two inclinations to right and to left could also be marked on the window; or at least the two extreme lines, so to speak, might be marked, beyond which the inclination of the flying machine would begin to become dangerous to stability.

But such an oblique scale graduation is not indispensable, as an observer's eye, especially if it is attentive and experienced, would be capable of estimating an angle, even of a few minutes, and moreover it is not of importance in flying to know the magnitude of such an angle of lateral inclination; it will therefore be sufficient for the pilot to endeavor always to maneuver in such a way as to keep, and if necessary continually to bring back the meniscus of the liquid into coincidence with one of the straight lines of the scale described above and illustrated in Fig. 2 of the drawings.

It is necessary now to point out that a lateral inclination which is not faulty, that is to say, the correct inclination when flying in a curve, will not be indicated by the meniscus of the liquid, for the said liquid will then be attracted not only by the inclination, that is to say by gravity, which would tend to impel it in one direction, but at the same time by centrifugal force, which would impel it in the opposite direction, in such a way that its meniscus will remain parallel to the lines of the scale.

An indication would only be given in the event of an excessive or insufficient inclination being impressed on the machine, for then one of the two forces mentioned above would prevail over the other, and the pilot, being warned, would have to correct the inclination. Since the instrument also has to serve for flying at considerable heights, it is necessary to take into account the possibility of low atmospheric pressure, in order to obviate any imperfect or inaccurate working. With this end in view a little hole is made in the upper part of the tube 2, this hole being normally kept closed by a spring or movable or rotatable ring provided with a suitable packing. This device (not shown in the drawing) for communicating with the atmosphere may appropriately be opened for a moment and reclosed, either when starting or at any other convenient time.

It will be necessary to provide for the illumination of the indicator frame when required, intermittently or otherwise. For this purpose a suitable battery of dry cells 11 has been provided (Fig. 1), placed between the tubes 2, 3, the poles being connected up in the following manner: the pole 12 with the mass of the instrument, and the pole 13 by the insulated wire 14 with the spring terminal 15 of a microlamp 16, the connection being under the projection 17 of the upper edge 8 of the frame.

A hood 18 covers and protects the spring terminal, which is also insulated, and which, at the desired moment, is operated by a mere forward pressure, and by removing the peg or plug 19 (Figs. 1 and 2) inserted in the said hood, and provided for this purpose with a projection of insulating material, which establishes or breaks the contact of the said terminal with the central pole of the lamp, the screw connection of which constitutes, as usual, its other poles.

What I claim is:

An automatic clinometer for aircraft, aeroplanes and the like, especially employed for flying at night or in foggy weather, characterized by the fact that it consists of two vessels communicating with one another, one of which acts as a reservoir and the other as an indicator, and that the indication and the measurement both of the longitudinal inclinations and of the faulty transverse inclinations of the machine, are given by the variations in level and by the obliquity of the meniscus of a liquid contained in the communicating vessels, on a scale provided on the indicator in the shape of a frame having a transparent outer surface.

In testimony that I claim the foregoing as my invention, I have signed my name in presence of two subscribing witnesses.

CORRADINO D'ASCANIO.

Witnesses:
 FERRUCCIO FECOBACCI,
 GIUSEPPE ACTENO.